(12) United States Patent
Christian et al.

(10) Patent No.: US 7,081,319 B2
(45) Date of Patent: Jul. 25, 2006

(54) PREPARATION OF NICKEL OXYHYDROXIDE

(75) Inventors: Paul A. Christian, Norton, MA (US); Tatjana Mezini, Medford, MA (US)

(73) Assignee: The Gillette Company, Boston, MA (US)

( * ) Notice: Subject to any disclaimer, the term of this patent is extended or adjusted under 35 U.S.C. 154(b) by 396 days.

(21) Appl. No.: 10/086,807

(22) Filed: Mar. 4, 2002

(65) Prior Publication Data

US 2004/0202931 A1    Oct. 14, 2004

(51) Int. Cl.
*H01M 4/32* (2006.01)
*H01M 4/52* (2006.01)
*H01M 4/58* (2006.01)
*H01M 6/00* (2006.01)

(52) U.S. Cl. .................................. 429/223; 29/623.5

(58) Field of Classification Search ................ 429/223, 429/206, 207, 42, 44; 423/581; 205/264, 205/257
See application file for complete search history.

(56) References Cited

U.S. PATENT DOCUMENTS

| | | | |
|---|---|---|---|
| 3,436,267 A | 4/1969 | Faber | |
| 3,899,350 A | 8/1975 | Jackovitz et al. | |
| 3,911,094 A * | 10/1975 | Megahed et al. | 423/594.19 |
| 4,074,030 A | 2/1978 | Ruben | |
| 4,224,392 A | 9/1980 | Oswin | |
| 4,481,128 A * | 11/1984 | Jackovitz et al. | 252/182.1 |
| 4,546,058 A | 10/1985 | Charkey et al. | |
| 4,605,604 A | 8/1986 | Pollack et al. | |
| 4,663,256 A | 5/1987 | Corrigan | |
| 4,844,948 A | 7/1989 | Nakahori et al. | |
| 5,336,276 A | 8/1994 | Pensabene et al. | |
| 5,348,822 A | 9/1994 | Ovshinsky et al. | |
| 5,453,336 A | 9/1995 | Adler et al. | |
| 5,494,763 A | 2/1996 | Behl et al. | |
| 5,508,121 A | 4/1996 | Sawa | |
| 5,514,497 A | 5/1996 | Furukawa | |
| 5,567,549 A | 10/1996 | Ovshinksy et al. | |
| 5,569,562 A | 10/1996 | Glemser et al. | |
| 5,620,813 A | 4/1997 | Lee et al. | |
| 5,691,086 A | 11/1997 | Baba et al. | |
| 5,700,596 A * | 12/1997 | Ikoma et al. | 429/206 |
| 5,744,259 A | 4/1998 | Ohta et al. | |
| 5,744,266 A | 4/1998 | Nunome et al. | |
| 5,759,718 A * | 6/1998 | Yao et al. | 429/223 |
| 5,800,947 A * | 9/1998 | Kohler et al. | 429/223 |
| 5,928,714 A | 7/1999 | Nunome et al. | |
| 5,958,621 A | 9/1999 | Kao | |
| 6,007,946 A | 12/1999 | Yano et al. | |
| 6,013,390 A | 1/2000 | Kimiya et al. | |
| 6,020,088 A | 2/2000 | Singh | |
| 6,083,642 A | 7/2000 | Kato et al. | |
| 6,492,062 B1 * | 12/2002 | Wang et al. | 429/223 |

FOREIGN PATENT DOCUMENTS

| | | |
|---|---|---|
| DE | 2122165 | 11/1972 |
| DE | 3513119 | 10/1986 |
| EP | 0 337 029 A2 | 10/1989 |
| EP | 0 800 222 A1 | 8/1997 |
| GB | 1124299 | 8/1968 |
| JP | 48-2384 | 1/1973 |
| JP | 56-145668 | 11/1981 |
| JP | 60143569 A | 6/1985 |
| JP | 61-158667 | 6/1986 |
| JP | 6318751 A | 8/1988 |
| JP | 01059766 A | 3/1989 |
| JP | 03055758 A | 3/1991 |
| JP | 04366553 A | 12/1992 |
| JP | 10-284075 | * 10/1998 |
| JP | 2001-202956 | * 7/2001 |
| RU | 339995 | 6/1972 |
| WO | 00/21151 | 4/2000 |

OTHER PUBLICATIONS

M. Butel et al., "Cobalt oxyhydroxides obtained by 'chimie douce' reactions: structure and electronic conductivity properties," *Solid State Ionics*, 122:271-284 (1999).

S. A. Megahed et al., "Sealed Nickel-Zinc Cells Using Stable Nicklec Oxyhydroxide Depolarizer," Proceedings of the Symposium on Battery Design and Optimization, *The Electrochemical Society, Inc.*, S. Gross, Ed., 79-1:259-282 (1979).

V. Pralong et al., "Oxidation mechanism of cobalt hydroxide to cobalt oxyhydroxide," *J. Mater. Chem.* 9:955-960 (1999).

* cited by examiner

Primary Examiner—Patrick Joseph Ryan
Assistant Examiner—Julian Mercado
(74) Attorney, Agent, or Firm—Fish & Richardson P.C.

(57) ABSTRACT

Nickel oxyhydroxide can be prepared by exposing a mixture of a nickel hydroxide and a hydroxide salt to ozone. The nickel oxyhydroxide is suitable for use in the cathode of a battery.

41 Claims, 2 Drawing Sheets

PREPARATION OF NICKEL OXYHYDROXIDE

TECHNICAL FIELD

This invention relates to methods of preparing nickel oxyhydroxide, and devices including nickel oxyhydroxide.

BACKGROUND

Batteries, such as alkaline batteries, are commonly used as energy sources. Generally, alkaline batteries have a cathode, an anode, a separator and an alkaline electrolyte solution. The cathode can include a cathode material (e.g., manganese dioxide or nickel oxyhydroxide), carbon particles to enhance the conductivity of the cathode, and a binder. The anode can be formed of a gel including zinc particles. The separator is disposed between the cathode and the anode. The alkaline electrolyte solution, which is dispersed throughout the battery, can be an aqueous solution of an alkali metal hydroxide such as potassium hydroxide, sodium hydroxide, lithium hydroxide or mixtures thereof.

SUMMARY

An alkaline battery includes a cathode including nickel oxyhydroxide and an anode including zinc. The nickel oxyhydroxide can be substantially carbonate-free.

In one aspect, a method of preparing nickel oxyhydroxide includes combining a nickel hydroxide and a hydroxide salt in an inert atmosphere to form a mixture, and exposing the mixture to ozone to form a nickel oxyhydroxide.

In another aspect, a primary alkaline battery includes a cathode, an anode, a separator, and an alkaline electrolyte. The cathode includes a substantially carbonate-free nickel oxyhydroxide. The carbonate-free nickel oxyhydroxide is a nickel oxyhydroxide prepared from a nickel hydroxide in the absence of carbon dioxide or a carbonate source. The carbonate source can include lithium carbonate, lithium bicarbonate, sodium carbonate, sodium bicarbonate, potassium carbonate, or potassium bicarbonate. The cathode can include an oxidizing additive. The anode can include metallic zinc or a zinc alloy. The electrolyte can include potassium hydroxide, sodium hydroxide, lithium hydroxide, or mixtures thereof.

In another aspect, a method of manufacturing a battery includes combining a nickel hydroxide and a hydroxide salt in an inert atmosphere to form a mixture, exposing the mixture to ozone to form a nickel oxyhydroxide, and assembling a cathode including the nickel oxyhydroxide, an anode, a separator, and an electrolyte to form the battery. The mixture can be a dry mixture.

In yet another aspect, a method of decreasing capacity loss during storage for nickel oxyhydroxide batteries includes combining a cobalt hydroxide-coated nickel hydroxide and a hydroxide salt in an inert atmosphere to form a mixture, exposing the mixture to ozone to form a cobalt oxyhydroxide-coated nickel oxyhydroxide, forming a cathode including the cobalt oxyhydroxide-coated nickel oxyhydroxide, and assembling the cathode, an anode, a separator, and an electrolyte to form the battery. The battery can have a capacity loss after storage for 4 weeks at 60° C. of less than about 30 percent, as disclosed in co-pending U.S. application Ser. No. 09/633,067, which is incorporated by reference in its entirety.

The inert atmosphere does not react with the nickel hydroxide. The inert atmosphere can be substantially free of carbon dioxide, substantially free of water, or substantially free of both. The inert atmosphere can be argon, nitrogen, helium or oxygen.

The nickel hydroxide can include a beta-nickel hydroxide, a cobalt hydroxide-coated beta-nickel hydroxide, an alpha-nickel hydroxide, a cobalt hydroxide-coated alpha-nickel hydroxide, a solid solution of alpha-nickel hydroxide and beta-nickel hydroxide, or a cobalt hydroxide-coated solid solution of alpha-nickel hydroxide and beta-nickel hydroxide. The nickel hydroxide can be substantially dry. The nickel hydroxide can be a powder including particles having a nominally spherical, spheroidal, or ellipsoidal shape. The nickel oxyhydroxide can be substantially carbonate-free. The nickel oxyhydroxide can include a beta-nickel oxyhydroxide, a cobalt oxyhydroxide-coated beta-nickel oxyhydroxide, a gamma-nickel oxyhydroxide, a cobalt oxyhydroxide-coated gamma-nickel oxyhydroxide, a solid solution of a beta-nickel oxyhydroxide and a gamma-nickel oxyhydroxide, or a cobalt oxyhydroxide-coated solid solution of a beta-nickel oxyhydroxide and a gamma-nickel oxyhydroxide.

The hydroxide salt can include alkali metal hydroxides such as potassium hydroxide, sodium hydroxide, lithium hydroxide, or mixtures thereof. The hydroxide salt can be substantially carbonate-free.

Typically, the mixture is maintained at a temperature between 15° C. and 20° C. while exposing the mixture to ozone. The method can include heating the mixture prior to or while exposing the mixture to ozone. The mixture can be heated to a temperature less than about 100° C. In certain circumstances, the method can include agitating, stirring, mixing or swirling the mixture while exposing the mixture to ozone. Exposing the mixture to ozone can include contacting the mixture with a gas mixture including ozone. The gas mixture can include dioxygen, water vapor or both. The mixture can be exposed to ozone for less than 24 hours, less than 12 hours, less than 8 hours, less than 6 hours, less than 4 hours or less than 3 hours.

The mixture can include an oxidation-promoting additive, such as, for example, metallic silver, silver(+1) oxide, silver (+1,+3) oxide, metallic gold, gold(+3) oxide, gold (+3) hydroxide, potassium peroxide, potassium superoxide, potassium permanganate, or silver permanganate. The nickel hydroxide can include at least one bulk dopant. The bulk dopant can be aluminum, manganese, cobalt, zinc, gallium, indium, or bismuth. The bulk dopant can be present at a relative weight percentage of less than about 10%, less than about 5% or less than about 2%.

The method of preparing nickel oxyhydroxide can decrease production times and improve the uniformity of the ozonation process. The method can eliminate extensive post-production treatment of the product of the ozonation process, such as, for example, filtration from a liquid, washing, drying, or separation from a mixture of products. The method features an improved synthetic process whereby both the complexity and duration of the treatment with ozone gas can be decreased substantially relative to other methods. Carbonate formation attributable to exposing the finely ground potassium hydroxide powder to moist air, which can lead to the formation of potassium carbonate, can inhibit completion of the oxidation process to form fully oxidized gamma-nickel oxyhydroxide, especially during ozonation of cobalt hydroxide-coated alpha-nickel hydroxide.

Other features and advantages of the invention will be apparent from the description and drawings, and from the claims.

DETAILED DESCRIPTION

Figure 1:
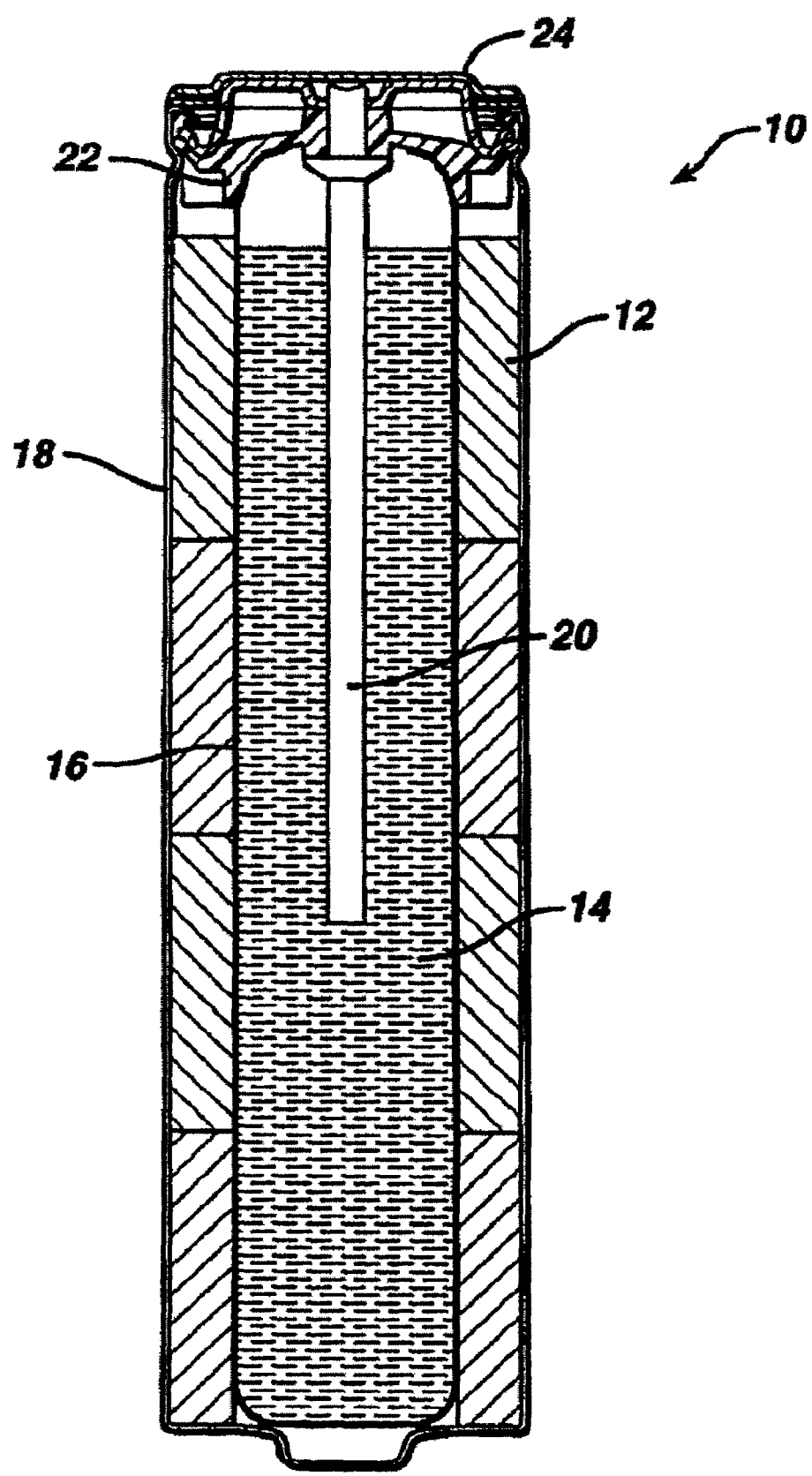
FIG. 1 is a drawing depicting a cross section of a cylindrical alkaline battery.

Nickel oxyhydroxide is prepared by combining a nickel hydroxide and a hydroxide salt in an inert atmosphere to form a mixture. The mixture can be a dry mixture. The mixture is exposed to ozone to form a nickel oxyhydroxide. The ozone can be mixed with dioxygen to form a treatment gas. The ozone can include sufficient water vapor to initiate the oxidation process. Excessive amounts of water vapor in the treatment gas can cause the powder in the mixture to agglomerate. The mixture can be exposed to ozone, for example, for less than twenty-four hours, less than twelve hours, less than six hours or less than four hours, to produce a nickel oxyhydroxide that contains little or no un-oxidized nickel hydroxide.

For example, a mixture of nickel hydroxide and hydroxide salt can be oxidized via ozonation at a temperature between 5 and 100° C., for example, between 10 and 60° C. or between 15 and 30° C. to provide a nickel oxyhydroxide. The temperature of the mixture can be maintained within a 10° C. range during the ozonation process. The mixture of nickel hydroxide and hydroxide salt can be formed by manual or mechanical grinding of a hydroxide salt into a fine powder, followed by manual or mechanical mixing of the nickel hydroxide with the ground hydroxide salt, and loading of the resulting mixed powders into a reaction vessel. The nickel hydroxide, the hydroxide salt, and mixtures thereof, are handled, ground, and mixed in an inert atmosphere. The hydroxide salt can include alkali metal hydroxides such as potassium hydroxide, sodium hydroxide, lithium hydroxide or mixtures thereof. The hydroxide salt can include silver hydroxide or gold hydroxide. The hydroxide salt can be in the form of a free-flowing powder, solid pellets, coarse crystallites, or agglomerates of crystallites.

The inert atmosphere is free of carbon dioxide and, optionally, water. For example, the inert atmosphere can be a dry, substantially air-free atmosphere. The dry, substantially air-free atmosphere can be provided inside a glove box purged with an inert gas stream and protected from infiltration of air. Suitable inert gases include nitrogen, argon, helium, and oxygen. The grinding and mixing operations are performed under an inert atmosphere in order to minimize exposure of the finely divided hydroxide salt to atmospheric moisture and carbon dioxide since a finely divided hydroxide salt can react rapidly in the presence of moisture with atmospheric carbon dioxide to produce a carbonate salt. For example, potassium hydroxide reacts rapidly with carbon dioxide in the presence of water vapor to form potassium carbonate. The presence of a carbonate salt in the mixture can greatly inhibit completion of oxidation of nickel hydroxide to nickel oxyhydroxide by ozone. When the nickel hydroxide is substantially carbonate-free nickel hydroxide, the nickel oxyhydroxide formed is an carbonate-free nickel oxyhydroxide.

The mixture can be exposed to ozone in a reaction vessel suitably modified to minimize infiltration of atmospheric air into the reaction vessel during the ozonation process. The reaction vessel can be fabricated from any of a variety of materials that are resistant to oxidation by ozone gas, such as for example, glass, fluorinated polymers such as PTFE, Kel-F, PVDF or stainless steel. The modifications to the reaction vessel can include attaching a small vestibule having a constricted orifice connected to the outlet of the reaction vessel to vent the gas flow exiting from the reaction vessel to the external atmosphere, optionally, through a gas bubbler. By constricting the orifice, a small backpressure of ozone gas can be applied to the reaction vessel, thereby increasing both the partial pressure of ozone and the average residence time of the ozone gas in the reaction vessel. The small vestibule also serves to collect any particles ejected from the reaction vessel or entrained in the exiting gas stream. The exposure to ozone can be carried out continuously thereby avoiding the infiltration of air into the reaction vessel before the ozonation process has been completed.

The nickel hydroxide can include a beta-nickel hydroxide, a cobalt hydroxide-coated beta-nickel hydroxide, an alpha-nickel hydroxide, a cobalt hydroxide-coated alpha-nickel hydroxide, a solid solution of a beta-nickel oxyhydroxide and gamma-nickel oxyhydroxide or a cobalt oxyhydroxide coated solid solution of a beta-nickel oxyhydroxide and gamma-nickel oxyhydroxide. The nickel hydroxide can be a substantially dry nickel hydroxide powder including particles having a nominally spherical, spheroidal or ellipsoidal shape. The average particle size of the nickel hydroxide powder can be between 1 and 100 microns, 2 and 50 microns or 5 and 10 microns. Suitable commercial beta-nickel hydroxide powders including nominally spherical particles can be obtained from Tanaka Chemical Co. (Fukui, Japan) under the designation type Z; H. C. Starck GmbH & Co. (Goslar, Germany) under the tradename Ampergy® type SNH C15Z40; or OM Group Inc. (Westlake, Ohio). A suitable cobalt hydroxide-coated beta-nickel hydroxide can be obtained from Tanaka Chemical Co. (Fukui, Japan) under the designation type CoZD; H.C. Starck GmbH & Co. (Goslar, Germany) under the tradename AMPERGY® type SNH C15Z40C45; or OM Group Inc. (Westlake, Ohio).

Nickel oxyhydroxide can include a beta-nickel(+3) oxyhydroxide, a cobalt oxyhydroxide-coated beta-nickel(+3) oxyhydroxide, a gamma-nickel(+3,+4) oxyhydroxide, or a cobalt oxyhydroxide-coated gamma-nickel(+3,+4) oxyhydroxide. Gamma-nickel(+3,+4) oxyhydroxide is a non-stoichiometric phase of nickel oxyhydroxide containing both Ni(+3) and Ni(+4) ions and can include a variable amount of water molecules, alkali metal cations, and anionic species inserted into the interlamellar region (viz., van der Waals gap) of a layered crystal structure. For example, Bode et al. proposed a nominal composition of $Na(NiO_2)_3 \cdot 2H_2O$ for a gamma-nickel oxyhydroxide prepared by oxidation of $NaNiO_2$ by bromine in NaOH solution. See for example, *Electrochim. Acta*, Vol. 16, 1971, p. 615. Another related nominal composition proposed for a gamma-nickel oxyhydroxide is $K(NiO_2)_3 \cdot zH_2O$ (where z is between 0.5 and 2). See, for example, Corrigan, et al., *J. Electrochem. Soc.*, Vol. 136, No. 3, 1989, pp. 613–619. Yet another nominal composition for a gamma-nickel oxyhydroxide is $Ni_{0.75}[K_{Ni}]_{0.25}O(OH)_{1.00}$, where $[K_{Ni}]$ refers to potassium ions located on vacant nickel lattice sites. See, for example, Comilsen et al., *Proceed. Electrochem. Soc.*, Vol. 86–12, 1986, pp. 114–121. Cobalt oxyhydroxide-coated gamma-nickel oxyhydroxide can be prepared from a cobalt hydroxide-coated alpha-nickel hydroxide, such as cobalt hydroxide-coated, alpha-nickel hydroxide bulk-doped with aluminum, cobalt or mixtures thereof. Aluminum bulk-doped alpha-nickel hydroxide can contain up to about 20 atom % of aluminum. Cobalt bulk doped alpha-nickel hydroxide can contain up to about 10 atom % of cobalt. A suitable cobalt hydroxide-coated alpha-nickel hydroxide containing aluminum and cobalt as bulk dopants having a nominal chemical composition of $Ni_{0.62}Al_{0.18}Co_{0.06}(OH)_2(CO_3)_{0.13} \cdot 0.17H_2O$ can be obtained from H. C. Starck GmbH & Co. (Goslar, Germany) or prepared as disclosed in EP 1,103,526. The gamma-nickel oxyhydroxide can include essentially non-fractured nickel oxyhydroxide particles. The non-fractured gamma-nickel oxyhydroxide particles can be nominally spherical, spheroidal or ellipsoidal in shape.

The cobalt oxyhydroxide coating can improve electrical contact between particles in the cathode as well as protect the surface of the nickel oxyhydroxide from degradation by reaction with the electrolyte. The coating can cover at least 60% of the surface of the nickel oxyhydroxide. Preferably, the coating can cover at least 70%, preferably at least 80%, more preferably at least 90% of the surface. The cobalt oxyhydroxide-modified nickel oxyhydroxide can be derived from nickel hydroxide coated with between 2% and 15%, between 3% and 10%, between 4% and 8% or between 4% and 5% cobalt hydroxide by weight. The cobalt hydroxide coating can optionally include at least one dopant. The dopant can be magnesium, calcium, strontium, barium, scandium, yttrium, lanthanum, rare earth elements, titanium, zirconium, hafnium, chromium, manganese, nickel, copper, silver, zinc, cadmium, aluminum, gallium, indium, bismuth or combinations thereof.

The method can decrease the length of time required to completely oxidize nickel hydroxide to nickel oxyhydroxide, for example, beta-nickel hydroxide to beta-nickel oxyhydroxide or alpha-nickel hydroxide to gamma-nickel oxyhydroxide. In addition, button cells with cathodes containing gamma-nickel oxyhydroxide prepared by the method of the present invention can provide both high-rate and low-rate discharge performance comparable to that obtained for cells with cathodes containing gamma-nickel oxyhydroxide prepared from the same cobalt hydroxide-coated alpha-nickel hydroxide containing aluminum and cobalt as bulk-dopants subjected to prolonged ozonation after mixing of the powders in air. For reference, the theoretical one-electron specific capacity for beta-nickel(+3) oxyhydroxide is about 292 mAhr/g. In the case of the gamma-nickel(+3, +4) oxyhydroxide, the theoretical specific capacity is about 325 mAhr/g for a 1.1 electron reduction and about 388 mAhr/g for a 1.33 electron reduction discharge mechanism.

The oxidation of nickel hydroxide by ozone can be accelerated by mixing the nickel hydroxide with an oxidation-promoting additive. The oxidation-promoting additive can be an additive known to promote oxidation of metal oxides. For example, a strong oxidant such as a superoxide salt, for example, potassium superoxide, can be substituted for all or part of the hydroxide salt mixed with nickel hydroxide and treated with ozone gas at room temperature to prepare nickel oxyhydroxide. In another example, metallic silver, silver oxide, or silver hydroxide can be mixed with nickel hydroxide and a metal hydroxide and then treated with ozone. Other oxidation-promoting additives include metallic gold, gold oxide, or gold hydroxide; potassium permanganate, or silver permanganate.

Referring to the FIG. 1, battery 10 includes a cathode 12 (positive electrode), an anode 14 (negative electrode), a separator 16 and a cylindrical housing 18. Battery 10 also includes current collector 20, seal 22, and a negative metal top cap 24, which serves as the negative terminal for the battery. The cathode is in contact with the housing, and the positive terminal of the battery is at the opposite end of the battery from the negative terminal. An electrolytic solution is dispersed throughout battery 10. Battery 10 can be, for example, an AA, AAA, AAAA, C, or D cylindrical battery. Alternatively, battery 10 can be a prismatic, laminar or thin battery or a coin cell or button cell.

Anode 14 can be formed of any of the standard zinc materials used in battery anodes. For example, anode 14 can be a zinc slurry that can include zinc metal particles, a gelling agent, and minor amounts of additives, such as a gassing inhibitor. In addition, a portion of the electrolyte solution can be dispersed throughout the anode.

The zinc particles can be any of the zinc particles conventionally used in slurry anodes. Examples of zinc particles can include those described in U.S. application. Ser. No. 08/905,254, U.S. application Ser. No. 09/115,867, or U.S. application Ser. No. 09/156,915, each of which is hereby incorporated by reference in its entirety. The anode can include, for example, between 60 wt % and 80 wt %, between 65 wt % and 75 wt %, or between 67 wt % and 71 wt % of zinc particles.

The electrolyte can be an aqueous solution of alkali hydroxide, such as potassium hydroxide, sodium hydroxide, lithium hydroxide, or mixtures thereof. The electrolyte can contain between 15 wt % and 60 wt %, between 20 wt % and 55 wt %, or between 30 wt % and 50 wt % alkali hydroxide dissolved in water. The electrolyte can contain 0 wt % to 6 wt % of a metal oxide, such as zinc oxide.

Examples of a gelling agent can include a polyacrylic acid, a grafted starch material, a salt of a polyacrylic acid, a carboxymethylcellulose, a salt of a carboxymethylcellulose (e.g., sodium carboxymethylcellulose) or combinations thereof. Examples of a polyacrylic acid include CARBOPOL 940 and 934 (available from B. F. Goodrich) and POLYGEL 4P (available from 3V), and an example of a grafted starch material includes WATERLOCK A221 or A220 (available from Grain Processing Corporation, Muscatine, Iowa). An example of a salt of a polyacrylic acid includes ALCOSORB G1 (available from Ciba Specialties). The anode can include, for example, between 0.05 wt % and 2 wt % or between 0.1 wt % and 1 wt % gelling agent.

A gassing inhibitor can include a metal such as bismuth, tin, indium, or mixtures thereof in the form of alloys. Alternatively, a gassing inhibitor can include an organic compound, such as a phosphate ester, an ionic surfactant or a nonionic surfactant. Examples of ionic surfactants are disclosed in, for example, U.S. Pat. No. 4,777,100, which is hereby incorporated by reference in its entirety.

Separator 16 can be a conventional battery separator. In some embodiments, separator 16 can be formed of two layers of non-woven, non-membrane material with one layer being disposed along a surface of the other. For example, to minimize the volume of separator 16 while providing an efficient battery, each layer of non-woven, non-membrane material can have a basic weight of about 54 grams per square meter, a thickness of about 5.4 mils when dry and a thickness of about 10 mils when wet. The layers can be substantially devoid of fillers, such as inorganic particles.

In other embodiments, separator 16 can include a layer of cellophane combined with a layer of non-woven material. The separator also can include an additional layer of non-woven material. The cellophane layer can be adjacent cathode 12 or the anode. The non-woven material can contain from 78 wt % to 82 wt % polyvinyl alcohol and from 18 wt % to 22 wt % rayon with a trace amount of a surfactant, such as non-woven material available from PDM under the trade name PA25.

Housing 18 can be a conventional housing commonly used in primary alkaline batteries, such as, for example, nickel-plated cold-rolled steel. The housing can include an inner metal wall and an outer electrically non-conductive material such as a heat shrinkable plastic. Optionally, a layer of conductive material can be disposed between the inner wall and cathode 12. The layer can be disposed along the inner surface of the inner wall, along the circumference of cathode 12, or both. The conductive layer can be formed, for example, of a carbonaceous material (e.g., colloidal graphite), such as LB1000 (Timcal), Eccocoat 257 (W.R. Grace & Co.), Electrodag 109 (Acheson Colloids Company), Electrodag EB-008 (Acheson), Electrodag 112 (Acheson) and EB0005 (Acheson). Methods of applying the conductive layer are disclosed in, for example, Canadian Patent No. 1,263,697, which is hereby incorporated by reference in its entirety. Optionally, a corrosion-resistant coating can be applied to the inner wall of the housing. The corrosion-resistant coating can include gold, titanium nitride, titanium oxynitride, or titanium oxycarbide.

Current collector 28 can be made from a suitable metal, such as brass. Seal 30 can be made, for example, of a nylon.

Cathode 12 includes an active cathode material, conductive carbon particles, and electrolyte solution. Optionally, Cathode 12 can also include an oxidizing additive, a gold (+3) salt, a binder, or combinations thereof. Generally, the cathode can include, for example, between 60% by weight and 97% by weight, between 80% by weight and 95% by weight, or between 85% by weight and 90% by weight active cathode material. The active cathode material can be nickel oxyhydroxide, for example, prepared as described hereinabove. The oxidizing additive is more readily reduced than the active cathode material and can thereby serve as a sacrificial additive. Examples of oxidizing additives can include sodium hypochlorite, sodium peroxydisulfate, potassium peroxydisulfate, potassium permanganate, barium permanganate, barium ferrate, silver permanganate, or disilver dioxide. The gold (+3) salt can include gold(+3) oxide, gold(+3) hydroxide, gold(+3) sulfide or gold(+3) acetate. The amount of gold(+3) salt can range from 2 to 1000 ppm, from 5 to 250 ppm or from 10 to 100 ppm. The gold(+3) salt can suppress a self-discharge reaction involving oxidation of water in the electrolyte to form oxygen gas by the nickel oxyhydroxide as disclosed in co-pending U.S. application Ser. No. 10/022,272, which is incorporated by reference in its entirety.

The conductive carbon particles can include graphite particles. The graphite particles can be synthetic graphite particles, including expanded graphite, non-synthetic, or natural graphite, or a blend thereof. Suitable graphite particles can be obtained from, for example, Brazilian Nacional de Grafite of Itapecerica, MG Brazil (e.g., NdG grade MP-0702X), Superior Graphite Co. of Chicago, Ill. (Superior ABG grade), Chuetsu Graphite Works, Ltd. (e.g., Chuetsu grades WH-20A and WH-20AF) of Japan or Timcal America of Westlake, Ohio (e.g., Timcal grade EBNB-90). The cathode can include, for example, between 2 wt % and 35 wt %, between 3 wt % and 10 wt %, or between 4 wt % and 8 wt % of conductive carbon particles or a blend of conductive carbon particles.

Examples of binders can include a polymer such as polyethylene, polyacrylamide, or a fluorocarbon resin, such as PVDF or PTFE. An example of a polyethylene binder is sold under the trade name COATHYLENE HA-1681 (available from Hoechst). The cathode can include, for example, between 0.05 wt % and 5 wt %, or between 0.1 wt % and 2 wt % binder.

A portion of the electrolyte solution can be dispersed through cathode 12, and the weight percentages provided above and below are determined after the electrolyte solution has been dispersed.

Batteries (e.g., button cells) including nickel oxyhydroxide in the cathode were prepared according to the following examples.

EXAMPLE 1

A mixture consisting of 50 g commercial beta-nickel hydroxide (Tanaka Chemical Co., type Z) and 2.08 g of freshly ground potassium hydroxide (Fluka Chemika) was prepared either manually with a mortar and pestle or mechanically using a high speed laboratory blade mill (Waring mixer/mill) in a dry, air-free atmosphere in an argon-purged glovebox. The mixture was transferred to a 1 liter glass Erlenmeyer reaction flask (Ace Glass Co.) while still protected from air. The flask was provided with multiple internal glass ribs to aid in tumbling and mixing of the powder during ozonation. The ozone gas was generated using a silent electrical discharge-type ozone generator (Ozonia OZAT® Model CFS1A). About 70 g/hr of ozone was produced mixed with dioxygen at an effective ozone concentration of about 10 to 12%. A total volumetric flowrate of about 4 liters/min was obtained with an oxygen gas inlet pressure of about 20 psi.

The ozone and dioxygen gas mixture was passed over a controlled volume of water (about 1 ml) in a 1 liter ballast flask connected upstream of the reaction flask in order to humidify the ozone gas before it passed over the dry powder mixture because some moisture is needed to initiate the oxidation process. Excessive amounts of moisture must be avoided in order to minimize agglomeration of the powder before oxidation can take place. Once the reaction starts, no additional moisture is required since water is generated as a side-product of the oxidation reaction. The reaction flask was rotated slowly to agitate and mix the powder thoroughly thereby ensuring uniform exposure of the powder mixture to the ozone gas. The reaction flask was partially submerged in a cooling bath to maintain a constant temperature of about 20° C. during ozonation. Almost immediately upon introduction of the ozone gas into the reaction flask, the green beta-nickel hydroxide powder turned black and formed coarse agglomerates that were broken up by the rotation of the flask as the powder dried. Ozonation was continued for about 4 hours. Samples were removed after about 2 hours (Example 1a) and 4 hours (Example 1b) of ozonation for evaluation of completeness of oxidation by powder x-ray diffraction (XRD) analysis. After 4 hours of ozonation, no un-oxidized beta-nickel hydroxide was detectable by XRD and the predominant product was beta-nickel oxyhydroxide. A small amount (i.e., <2 wt %) of gamma-nickel oxyhydroxide present as well.

EXAMPLE 2

A mixture consisting of 72 g cobalt hydroxide-coated beta-nickel hydroxide (H. C. Starck) and 3 g of freshly ground potassium hydroxide (Fluka Chemika) was prepared either manually or mechanically as in Example 1. The mixture was treated with ozone in the same manner as described in Example 1. Upon introduction of ozone to the reaction vessel, the cobalt hydroxide-coated beta-nickel hydroxide changed from gray-green in color to black and formed coarse agglomerates that subsequently were broken up by tumbling as the formed cobalt oxyhydroxide-coated beta-nickel oxyhydroxide dried. XRD analysis was used to determine that oxidation to cobalt oxyhydroxide-coated beta-nickel oxyhydroxide was complete after a total of about 5 hours of ozonation (Example 2a). Unlike Example 1, no evidence of formation of gamma-nickel oxyhydroxide was observed.

EXAMPLE 3

A mixture consisting of 37.5 g cobalt hydroxide-coated alpha-nickel hydroxide containing aluminum and cobalt dopants (H. C. Starck), 6.75 g freshly ground potassium hydroxide (Fluka Chemika), and 0.96 g freshly ground sodium hydroxide (Aldrich, ACS Reagent) was prepared either manually with a mortar and pestle or mechanically using a high speed laboratory blade mill (Waring mixer/mill) in a dry, air-free atmosphere, for example, inside an argon-purged glovebox. The mixture was transferred to a reaction flask inside a purged argon glovebox and initially treated with a humidified ozone gas stream as in Example 1.

Upon introduction of ozone gas into the reaction flask, the gray-green alpha-nickel hydroxide powder turned black and formed coarse agglomerates that were broken up by the rotation of the flask. After about two hours of ozonation, the powder turned from black to a dark charcoal gray color as the powder dried. Ozonation was continued for a total of 8 to 10 hours and samples removed after about 2 hours (Example 3a), 6 hours (Example 3b), and 9 hours (Example 3c) of ozonation to evaluate completeness of oxidation by powder XRD analysis. Surprisingly, after only 2 hours of ozonation, no un-oxidized alpha-nickel hydroxide remained.

X-Ray Diffraction Analysis

The observed values for the two-theta angles and the corresponding d-spacings for the (001) and (101) or (001) and (002) diffraction lines of the starting materials and the (001) and (002) or (003) and (006) lines of the products from Examples 1, 2, and 3 are given in Table 1.

TABLE 1

| Ex. No. | O₃ Time (hrs) | Peak 1 2θ angle | Peak 1 (hkl) | D (Å) | Peak 2 2θ angle | Peak 2 (hkl) | D (Å) |
| --- | --- | --- | --- | --- | --- | --- | --- |
| — | 0 | 18.95 | 001 | 4.679 | 38.55 | 101 | 2.333 |
| 1a | 2 | 19.08 | 001 | 4.647 | 38.55 | 002 | 2.333 |
| 1b | 4 | 19.08 | 001 | 4.647 | 38.68 | 002 | 2.326 |
| — | 0 | 19.11 | 001 | 4.641 | 38.42 | 002 | 2.341 |
| 2a | 5 | 19.05 | 001 | 4.654 | 38.42 | 101 | 2.341 |
| — | 0 | 11.32 | 001 | 7.810 | 22.76 | 002 | 3.904 |
| 3a | 2 | 12.56 | 003 | 7.042 | 25.28 | 006 | 3.520 |
| 3b | 6 | 12.52 | 003 | 7.064 | 25.21 | 006 | 3.530 |
| 3c | 8 | 12.72 | 003 | 6.953 | 25.40 | 006 | 3.504 |

Figure 2:
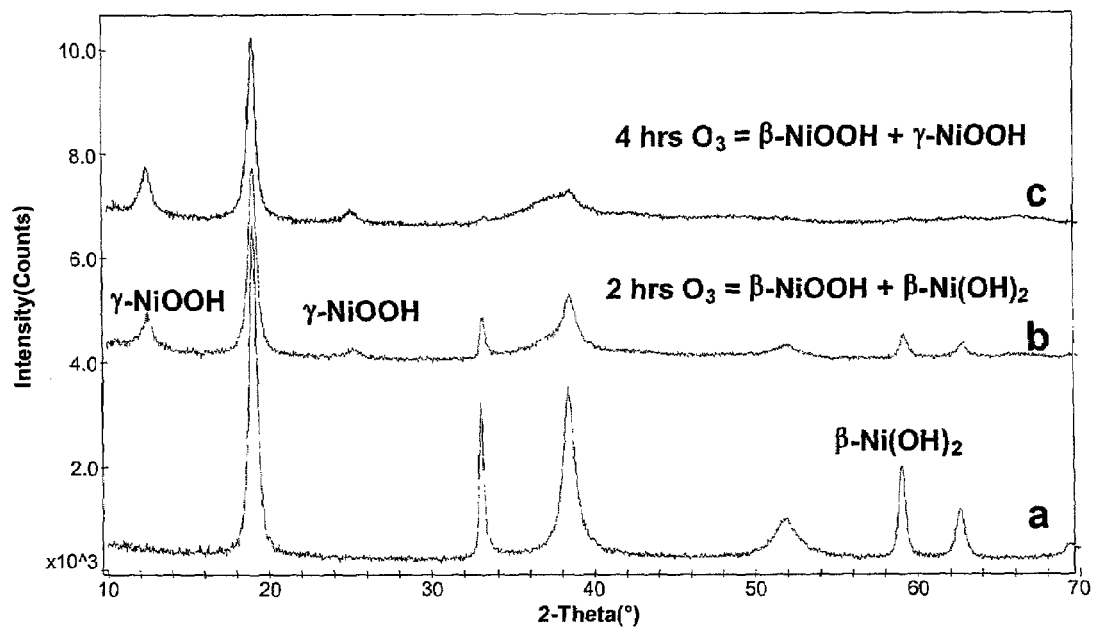
FIG. 2 is a graph depicting the x-ray powder diffraction patterns for: (a) a commercial beta-nickel hydroxide; (b) a mixture of beta-nickel hydroxide, beta-nickel oxyhydroxide, and a trace amount of gamma-nickel oxyhydroxide after 2 hours of ozonation; (c) a mixture of beta-nickel oxyhydroxide and a small amount of gamma-nickel oxyhydroxide after a total of 4 hours of ozonation.

The products of Example 1, Example 1a which was removed after 2 hours of ozonation and Example 1b which was removed after 4 hours of ozonation, and the beta-nickel hydroxide starting material were examined by XRD. The XRD powder patterns were measured and are shown in FIG. 2. The diffraction lines of the beta-nickel hydroxide starting material shown in FIG. 2 (curve A) corresponded closely to those reported in the standard XRD pattern (i.e., ICDD PDF-2, No. 14-0117) for beta-nickel hydroxide. After two hours of ozonation, the intensities of the beta-nickel hydroxide peaks decreased and the remaining peaks broadened substantially, as shown in FIG. 2 (curve B). Also, a low intensity peak appeared at a two-theta angle (Cu Kα) of about 12° along with a low intensity broad peak centered on a two-theta angle of about 23°. These two weak peaks corresponded to the two most intense peaks in the powder pattern of gamma-nickel oxyhydroxide (i.e., ICDD PDF-2, No. 06-0075). After four hours of ozonation, all the characteristic peaks of beta-nickel hydroxide disappeared completely FIG. 2 (curve C). In addition to the very weak peaks attributed to gamma-nickel oxyhydroxide, there remained only a broad, intense peak at a two-theta angle of about 19° and a very broad, low intensity peak centered on a two-theta angle of about 38° that could be assigned to beta-nickel oxyhydroxide.

The XRD patterns for the oxidized product of Example 2 removed after 5 hours of ozonation (Example 2a) and the cobalt hydroxide-coated beta-nickel hydroxide starting material were measured. The diffraction lines of the cobalt hydroxide-coated beta-nickel hydroxide correspond closely to those in the standard XRD pattern for beta-nickel hydroxide (i.e., ICDD PDF-2, No. 14-0117). The XRD pattern for Example 2a showed no traces of lines attributable to beta-nickel hydroxide and only exhibited lines characteristic of beta-nickel oxyhydroxide as shown in FIG. 2 (curve C). No lines attributable to gamma-nickel oxyhydroxide were observed.

Figure 3:
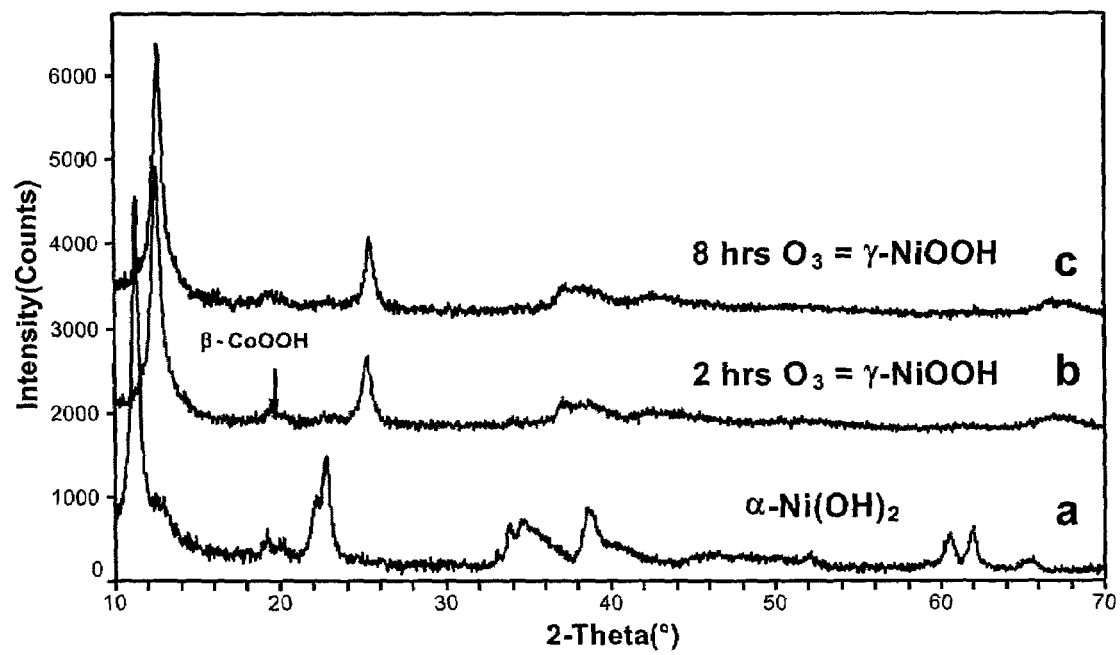
FIG. 3 is a graph depicting the x-ray powder diffraction patterns for: (a) a cobalt hydroxide-coated, aluminum and cobalt bulk-doped alpha-nickel hydroxide; (b) a cobalt oxyhydroxide-coated gamma-nickel oxyhydroxide after 2 hours of ozonation; (c) a cobalt oxyhydroxide-coated gamma-nickel oxyhydroxide and trace amounts of beta-cobalt oxyhydroxide after a total of 8 hours of ozonation.

The products of Example 3 that were removed after 2 hours of ozonation (Example 3a) and after 8 hours of ozonation (Example 3c), and the cobalt hydroxide-coated aluminum and cobalt bulk-doped alpha-nickel hydroxide starting material were examined. The XRD powder pattern measured for cobalt hydroxide-coated aluminum and cobalt bulk-doped alpha-nickel hydroxide starting material FIG. 3 (curve A) corresponds closely to those reported by B. Liu, et al., *J. Appl. Electrochem.*, Vol. 29, 1999, pp. 855–60, and A. Sugimoto, et al.,. *J. Electrochem. Soc.*, Vol. 145, no. 4, 1999, pp. 1251–5, each of which is incorporated by reference in its entirety, for aluminum-substituted alpha-nickel hydroxide. Samples were removed after 2, 4, 6, and 8 hours of ozonation. After two hours of ozonation (Example 3a), the very intense peak at a two-theta angle of about 11.5° (003), the less intense peak at a two-theta angle of about 22.5° (006), and other weaker peaks at two-theta angles of about 35° (101) and (012), 39° (015), 60.5° (110), and 61.7° (113) characteristic of alpha-nickel hydroxide were absent, as shown in FIG. 3 (curve B). However, a very intense, broad peak appeared at a two-theta angle of about 12.5° as well as a somewhat less intense, broad peak at a two-theta angle of about 25°. Other broad, low intensity peaks characteristic of a gamma-nickel oxyhydroxide phase (i.e., ICDD PDF-2, No. 06-0075) appeared at two-theta angles of about 38°, 43.5°, and 67.5°. In addition, a very weak, very broad peak at a two-theta angle of about 19° possibly corresponding to the most intense peak of beta-nickel oxyhydroxide was observed. The XRD pattern for the sample removed after 6 hours of ozonation (Example 3b) was nearly identical in appearance to that of Example 3a except that the two most intense diffraction peaks (i.e., 12.5° and 25°) had shifted to slightly higher two-theta angles. The other peaks were too broad and too weak to observe the small shifts. The XRD pattern for a sample removed after eight hours of ozonation (Example 3c) was very similar to that for the sample removed after six hours of ozonation (Example 3b), except that the two most intense peaks (i.e., 12.75° and 25.5°) once again shifted to slightly higher two-theta angles as shown in FIG. 3 (curve C). This trend is readily apparent as shown in Table 1. The main ozonation product from Example 3 was identified by XRD to be gamma-nickel oxyhydroxide containing a trace of cobalt oxyhydroxide. The small amount of cobalt oxyhydroxide can be formed by oxidation of the cobalt hydroxide in the coating on the alpha-nickel hydroxide.

COMPARATIVE EXAMPLE 1

A sample of cobalt oxyhydroxide-coated gamma-nickel oxyhydroxide prepared from a cobalt hydroxide-coated alpha-nickel hydroxide containing aluminum and cobalt bulk dopants comparable to that used in Example 3, except that no special precautions were taken to exclude atmospheric air during preparation of the reaction mixture or during ozonation. Samples were removed periodically as in Example 3 to evaluate completeness of oxidation by powder XRD analysis. After between 40 (Comparative Example 1a) and 48 hours (Comparative Example 1b) of ozonation, the oxidation reaction was judged to have gone to completion. The XRD patterns were nearly identical to that for Example 3c shown in FIG. 3 (curve C).

Test Cells

A portion of the beta-nickel oxyhydroxide of Example 1b was evaluated as the active cathode material in alkaline 635-type button cells. A cathode mixture was prepared by mixing 1.80 g beta-nickel oxyhydroxide, 1.05 g natural graphite (Nacional de Grafite type MP-0702x), and 0.15 g of aqueous electrolyte solution containing 38 wt % KOH and 2 wt % ZnO with a mortar and pestle. Cathode disks weighing nominally 0.5 g were pressed directly into a nickel wire grid welded to the bottom of the cathode can at an applied pressure of 10,000 pounds. A separator disk wetted with electrolyte was placed on top the cathode disk. A plastic seal was positioned on the anode can and 2.6 g gelled zinc slurry containing 60 wt % zinc alloy particles, 39.5 wt % electrolyte, and about 0.5 wt % gelling agent was added to the anode can. The cathode can was positioned overlying the anode can and the cell was manually crimped shut. Multiple button cells were fabricated and the discharge performance evaluated at nominally high (i.e., 43 mA, 0.8C) and low (i.e., 3 mA, C/30) rates to a 0.6 V cutoff. OCV values for cells measured immediately before discharge and specific capacities for cells discharged at both high and low rates to a 0.8 V cutoff are given in Table 2. The reported values are the averages for four or five individual cells. Capacity retention also was evaluated for cells stored at 60° C. for 24 hours (Example 1c). The specific capacities for cells discharged at high and low rates after storage at 60° C. for 24 hours and the corresponding percent cumulative capacity loses relative to fresh cells discharged at the same rates are listed in Table 2.

A portion of the cobalt oxyhydroxide coated beta-nickel oxyhydroxide of Example 2a was evaluated as an active cathode material in alkaline 635 button cells. A cathode mixture was prepared in the same manner as for the uncoated beta-nickel oxyhydroxide of Example 1b. Multiple button cells were fabricated and discharge performance evaluated at nominally high and low rates to a 0.8V cutoff after an 18 to 24 hour rest period at room temperature. OCV values and specific capacities are given in Table 2. Capacity retention was evaluated for cells stored at 60° C. for 1 day (Example 2b), 7 days (Example 2c), and 14 days (Example 2d). Specific capacities after storage and corresponding cumulative capacity losses relative to fresh cells discharged at the same rates are given in Table 2.

Button cells were also prepared having cathodes containing the gamma-nickel oxyhydroxide of Example 3c. A cathode mixture was prepared by mixing 1.80 g gamma-nickel oxyhydroxide, 1.05 g natural graphite (Nacional de Grafite type MP-0702x), and 0.15 g of aqueous electrolyte solution containing 38 wt % KOH and 2 wt % ZnO with a mortar and pestle. Cathode disks weighing nominally 0.5 g were pressed directly into a nickel wire grid welded to the bottom of the cathode can at an applied pressure of 10,000 pounds. A separator disk wetted with electrolyte was placed on top the cathode disk. A plastic seal was positioned on top of the separator and 2.6 g of a gelled zinc slurry containing 60 wt % zinc alloy particles, 39.5 wt % electrolyte, and about 0.5 wt % gelling agent was added to the cell. The anode can was positioned in the seal and the button cell manually crimped shut. Multiple button cells were fabricated and the discharge performance of fresh cells evaluated at nominally high and low rates to a 0.8 V cutoff. OCV values measured immediately before discharge and specific capacities for cells discharged at high and low rates to a 0.8 V cutoff are given in Table 2. The reported values are averaged for four or five individual cells. Capacity retention also was evaluated for cells stored at 60° C. for 7 days (Example 3d), 14 days (Example 3e), and 28 days (Example 3f). Specific capacities after storage and the corresponding cumulative capacity losses relative to fresh cells discharged at the same rates are given in Table 2.

Button cells having cathodes containing the cobalt oxyhydroxide-coated gamma-nickel oxyhydroxide of Comparative Examples 1a and 1b gave specific capacities as well as OCV values comparable to those of Example 3c. However, more than 5 times the ozonation time was required to prepare the cobalt oxyhydroxide coated gamma-nickel oxyhydroxide of Comparative Example 1b as to prepare the cobalt oxyhydroxide coated gamma-nickel oxyhydroxide of Example 3c.

TABLE 2

| Ex. No. | $O_3$ Time (hrs) | Storage @ 60° C. (days) | OCV (V) | Capacity @ 0.8 C (mAhr/g) | Capacity Loss (%) | Capacity @ C/30 (mAhr/g) | Capacity Loss (%) |
|---|---|---|---|---|---|---|---|
| 1b | 4 | 0 | 1.81 | 223 | — | 276 | — |
| 1c | 4 | 1 | 1.72 | 119 | 47 | 241 | 13 |
| 2a | 5 | 0 | 1.80 | 207 | — | 233 | — |
| 2b | 5 | 1 | 1.72 | 179 | 14 | 203 | 13 |
| 2c | 5 | 7 | 1.70 | 140 | 32 | 158 | 32 |
| 2d | 5 | 14 | 1.69 | 119 | 43 | 127 | 45 |
| 3c | 8 | 0 | 1.82 | 224 | — | 281 | — |

TABLE 2-continued

| Ex. No. | O₃ Time (hrs) | Storage @ 60° C. (days) | OCV (V) | Capacity @ 0.8 C (mAhr/g) | Capacity Loss (%) | Capacity @ C/30 (mAhr/g) | Capacity Loss (%) |
|---|---|---|---|---|---|---|---|
| 3d | 8 | 7 | 1.68 | 208 | 7 | 233 | 17 |
| 3e | 8 | 14 | 1.68 | 194 | 13 | 219 | 22 |
| 3f | 8 | 28 | 1.67 | 172 | 23 | 197 | 30 |
| C1a | 40 | 0 | 1.77 | 224 | — | 281 | — |
| C1b | 48 | 0 | 1.80 | 240 | — | 280 | — |

The theoretical specific capacity for beta-nickel oxyhydroxide is about 292 mAhr/g. The average value for the low rate specific capacity of cells with cathodes containing the beta-nickel oxyhydroxide of Example 1b is nearly 96% of the theoretical one-electron capacity. In the absence of stabilizing additives or a cobalt oxyhydroxide coating, the capacity retention of the cells of Example 1c containing the beta-nickel oxyhydroxide of Example 1b is about 58%.

Capacity retention by cells having cathodes containing cobalt oxyhydroxide coated beta-nickel oxyhydroxide is substantially better than for cells with cathodes containing un-coated beta-nickel oxyhydroxide. In the absence of stabilizing additives, capacity retention by the cells of Example 2b after 24 hours storage at 60° C. was about 85%. After 14 days, the capacity retention by the cells of Example 2d decreased to about 55%.

The capacity retention of cells with cathodes containing cobalt oxyhydroxide coated gamma-nickel oxyhydroxide is even greater than that for cells with cathodes containing cobalt oxyhydroxide coated beta-nickel oxyhydroxide. Capacity retention can be improved further by incorporating very small amounts (e.g., 10–100 ppm) of a variety of gold(+3) salts in the cathode as disclosed in co-pending U.S. application Ser. No. 10/022,272, which is incorporated by reference in its entirety.

Other embodiments are within the claims.

What is claimed is:

1. A method of preparing nickel oxyhydroxide, the method comprising:
combining a nickel hydroxide and a hydroxide salt in an inert atmosphere to form a dry mixture; humidifying ozone to form humidified ozone; and
contacting the dry mixture with the humidified ozone to form a nickel oxyhydroxide.

2. The method of claim 1, wherein the nickel hydroxide includes a beta-nickel hydroxide, a cobalt hydroxide-coated beta-nickel hydroxide, an alpha-nickel hydroxide, or a cobalt hydroxide-coated alpha-nickel hydroxide.

3. The method of claim 1, wherein the nickel oxyhydroxide includes a beta-nickel oxyhydroxide, a cobalt oxyhydroxide-coated beta-nickel oxyhydroxide, a gamma-nickel oxyhydroxide, or a cobalt oxyhydroxide-coated gamma-nickel oxyhydroxide.

4. The method of claim 1, wherein the inert atmosphere is substantially free of carbon dioxide.

5. The method of claim 1, wherein the inert atmosphere is substantially free of water.

6. The method of claim 1, wherein the inert atmosphere is substantially free of carbon dioxide and substantially free of water.

7. The method of claim 1, further comprising heating the dry mixture prior to contacting the dry mixture with the humidified ozone.

8. The method of claim 1, further comprising agitating the dry mixture while contacting the dry mixture with the humidified ozone.

9. The method of claim 1, wherein contacting the dry mixture with humidified ozone comprises contacting the dry mixture with a gas mixture including ozone.

10. The method of claim 9, wherein the gas mixture includes dioxygen.

11. The method of claim 1, wherein the nickel hydroxide is a powder including particles having a spherical, spheroidal, or ellipsoidal shape.

12. The method of claim 1, wherein the nickel hydroxide is a substantially dry nickel hydroxide.

13. The method of claim 1, wherein the hydroxide salt includes potassium hydroxide, sodium hydroxide, lithium hydroxide, or mixtures thereof.

14. The method of claim 1, wherein the hydroxide salt includes silver hydroxide or gold hydroxide.

15. The method of claim 1, wherein the method comprises contacting the dry mixture with the humidified ozone for less than 24 hours.

16. The method of claim 15, wherein the nickel hydroxide includes a cobalt hydroxide-coated beta-nickel hydroxide or a cobalt hydroxide-coated alpha-nickel hydroxide.

17. The method of claim 1, wherein the mixture further includes an oxidation-promoting additive.

18. The method of claim 17, wherein the oxidation-promoting additive includes metallic silver, silver(+1) oxide, silver(+1,+3) oxide, metallic gold, gold (+3) oxide, gold (+3) hydroxide, potassium peroxide, potassium superoxide, potassium permanganate, or silver permanganate.

19. The method of claim 1, wherein the nickel hydroxide includes a bulk dopant.

20. The method of claim 1, wherein the bulk dopant includes aluminum, manganese, cobalt, gallium, indium, or bismuth.

21. The method of claim 1, wherein the inert atmosphere includes a gas selected from the group consisting of nitrogen, argon, helium, and oxygen.

22. The method of claim 1, wherein the inert atmosphere is substantially free of air.

23. The method of claim 1, further comprising heating the dry mixture while contacting the dry mixture with the humidified ozone.

24. The method of claim 1, wherein combining a nickel hydroxide and a hydroxide salt in an inert atmosphere comprises contacting the nickel hydroxide and the hydroxide salt with an inert gas.

25. A method of manufacturing a battery, the method comprising:
combining a nickel hydroxide and a hydroxide salt in an inert atmosphere to form a dry mixture; humidifying ozone to form humidified ozone;
contacting the dry mixture with the humidified ozone to form a nickel oxyhydroxide; and assembling a cathode comprising the nickel oxyhydroxide, an anode, a separator, and an electrolyte to form the battery.

26. The method of claim 25, wherein the inert atmosphere is substantially free of carbon dioxide.

27. The method of claim 25, wherein the inert atmosphere is substantially free of water.

28. The method of claim 25, wherein the inert atmosphere is substantially free of carbon dioxide and substantially free of water.

29. The method of claim 25, wherein the inert atmosphere includes a gas selected from the group consisting of nitrogen, argon, helium, and oxygen.

30. The method of claim 25, wherein the inert atmosphere is substantially free of air.

31. The method of claim 25, wherein the battery is a primary battery.

32. The method of claim 25, wherein combining a nickel hydroxide and a hydroxide salt in an inert atmosphere comprises contacting the nickel hydroxide and the hydroxide salt with an inert gas.

33. A method of decreasing capacity loss in a nickel oxyhydroxide battery, the method comprising:
   combining a nickel hydroxide and a hydroxide salt in an inert atmosphere to form a dry mixture;
   humidifying ozone to form humidified ozone;
   contacting the dry mixture with the humidified ozone to form a nickel oxyhydroxide;
   forming a cathode including the nickel oxyhydroxide; and
   assembling the cathode, an anode, a separator, and an electrolyte to form the battery,
   wherein the battery has a capacity loss after storage for 4 weeks at 60° C. of less than 30 percent.

34. The method of claim 33, wherein the nickel hydroxide is cobalt hydroxide modified nickel hydroxide.

35. The method of claim 33, wherein the inert atmosphere is substantially free of carbon dioxide.

36. The method of claim 33, wherein the inert atmosphere is substantially free of water.

37. The method of claim 33, wherein the inert atmosphere is substantially free of carbon dioxide and substantially free of water.

38. The method of claim 33, wherein the inert atmosphere includes a gas selected from the group consisting of nitrogen, argon, helium, and oxygen.

39. The method of claim 33, wherein the inert atmosphere is substantially free of air.

40. The method of claim 33, wherein the battery is a primary battery.

41. The method of claim 33, wherein combining a nickel hydroxide and a hydroxide salt in an inert atmosphere comprises contacting the nickel hydroxide and the hydroxide salt with an inert gas.

* * * * *

UNITED STATES PATENT AND TRADEMARK OFFICE
CERTIFICATE OF CORRECTION

| | | |
|---|---|---|
| PATENT NO. | : 7,081,319 B2 | Page 1 of 1 |
| APPLICATION NO. | : 10/086807 | |
| DATED | : July 25, 2006 | |
| INVENTOR(S) | : Paul A. Christian and Tatjana Mezini | |

It is certified that error appears in the above-identified patent and that said Letters Patent is hereby corrected as shown below:

Col. 13, in claim 1, line 43, replace:

"combining a nickel hydroxide and a hydroxide salt in an inert atmosphere to form a dry mixture; humidifying ozone to form humidified ozone; and"

with the following paragraphs:

--combining a nickel hydroxide and a hydroxide salt in an inert atmosphere to form a dry mixture;
humidifying ozone to form humidified ozone; and--

Col. 14, in claim 25, line 63, replace:

"combining a nickel hydroxide and a hydroxide salt in an inert atmosphere to form a dry mixture; humidifying ozone to form humidified ozone;"

with the following paragraphs:

--combining a nickel hydroxide and a hydroxide salt in an inert atmosphere to form a dry mixture;
humidifying ozone to form humidified ozone;--

Signed and Sealed this

Third Day of July, 2007

JON W. DUDAS
*Director of the United States Patent and Trademark Office*